United States Patent
Bashkirtsev et al.

(10) Patent No.: US 9,355,747 B2
(45) Date of Patent: May 31, 2016

(54) LIGHT-WATER REACTOR FUEL ASSEMBLY (ALTERNATIVES), A LIGHT-WATER REACTOR, AND A FUEL ELEMENT OF FUEL ASSEMBLY

(75) Inventors: Sergey M. Bashkirtsev, Moscow (RU); Valentin F. Kuznetsov, Moscow (RU); Valery V. Kevrolev, Moscow (RU); Alexey G. Morozov, Moscow (RU)

(73) Assignee: Thorium Power, Inc., Reston, VA (US)

( * ) Notice: Subject to any disclaimer, the term of this patent is extended or adjusted under 35 U.S.C. 154(b) by 655 days.

(21) Appl. No.: 13/139,677

(22) PCT Filed: Dec. 25, 2008

(86) PCT No.: PCT/RU2008/000801
§ 371 (c)(1),
(2), (4) Date: Sep. 9, 2011

(87) PCT Pub. No.: WO2010/074592
PCT Pub. Date: Jul. 1, 2010

(65) Prior Publication Data
US 2011/0311016 A1    Dec. 22, 2011

(51) Int. Cl.
*G21C 3/04* (2006.01)
*G21C 3/02* (2006.01)
*G21C 3/326* (2006.01)
(Continued)

(52) U.S. Cl.
CPC *G21C 3/02* (2013.01); *G21C 3/326* (2013.01); *G21C 3/60* (2013.01); *G21C 5/20* (2013.01); *G21C 1/024* (2013.01); *G21C 3/3305* (2013.01); *G21C 2003/3265* (2013.01); *Y02E 30/32* (2013.01); *Y02E 30/38* (2013.01)

(58) Field of Classification Search
USPC .......................... 376/435, 438, 900, 903, 904
See application file for complete search history.

(56) References Cited

U.S. PATENT DOCUMENTS 2,780,517 A    2/1957 Fontana
2,879,216 A    3/1959 Hurwitz, Jr. et al.
(Continued)

FOREIGN PATENT DOCUMENTS

CN    86108810 A    8/1987
CN    1192820 A    9/1998
(Continued)

OTHER PUBLICATIONS

International Search Report from Russian Patent Office in corresponding Patent Application PCT/RU2007/000732 mailed Jul. 10, 2008.
(Continued)

*Primary Examiner* — Sean P Burke
(74) *Attorney, Agent, or Firm* — Venable LLP; Steven J. Schwarz

(57) ABSTRACT

A 17×17 jacketless fuel assembly for a PWR-type light-water reactor uses thorium as the fuel. The fuel assembly has a square shape in the plan view, a seed region, a blanket region that encircles it, an upper nozzle, and a lower nozzle. The fuel elements of the seed region re arranged in the rows and columns of a square coordinate grid and have a four-lobed profile that forms spiral spacer ribs along the length of a fuel element. The blanket region contains a frame structure within which a bundle of fuel elements made from thorium with the addition of enriched uranium is positioned. The blanket region fuel elements are arranged in the two or three rows and columns of a square coordinate grid.

22 Claims, 7 Drawing Sheets

(51) Int. Cl.
  *G21C 3/60*    (2006.01)
  *G21C 5/20*    (2006.01)
  G21C 1/02     (2006.01)
  G21C 3/33     (2006.01)

(56) References Cited

U.S. PATENT DOCUMENTS

| | | |
|---|---|---|
| 2,887,357 A | 5/1959 | Seaborg et al. |
| 2,894,827 A | 7/1959 | Hyde et al. |
| 2,898,185 A | 8/1959 | Boyd et al. |
| 3,030,291 A | 4/1962 | Butler et al. |
| 3,034,975 A | 5/1962 | Beurtheret |
| 3,046,088 A | 7/1962 | Horn |
| 3,063,925 A | 11/1962 | Huet |
| 3,070,527 A | 12/1962 | Hurford et al. |
| 3,088,900 A | 5/1963 | Brown et al. |
| 3,096,264 A | 7/1963 | Bauer |
| 3,105,035 A | 9/1963 | Weems |
| 3,133,867 A | 5/1964 | Frisch |
| 3,154,471 A | 10/1964 | Radkowsky |
| 3,177,123 A | 4/1965 | Huet |
| 3,197,376 A * | 7/1965 | Balent et al. ............ 376/171 |
| 3,197,383 A | 7/1965 | Maillet |
| 3,208,912 A | 9/1965 | Jaye et al. |
| 3,219,535 A | 11/1965 | Robbins |
| 3,252,867 A | 5/1966 | Conley |
| 3,275,564 A | 9/1966 | Pascard |
| 3,282,335 A | 11/1966 | De Haller |
| 3,285,825 A | 11/1966 | Jens |
| 3,308,033 A | 3/1967 | Alfille et al. |
| 3,309,277 A | 3/1967 | Jaye et al. |
| 3,322,644 A | 5/1967 | Benson |
| 3,335,060 A | 8/1967 | Diener |
| 3,339,631 A | 9/1967 | McGurty et al. |
| 3,361,640 A | 1/1968 | Hassig et al. |
| 3,366,547 A | 1/1968 | Gumuchian et al. |
| 3,378,453 A | 4/1968 | Gorker |
| 3,394,049 A | 7/1968 | Jones |
| 3,486,973 A | 12/1969 | Georges et al. |
| 3,546,068 A | 12/1970 | Schluderberg |
| 3,567,582 A | 3/1971 | Van Dievoet et al. |
| 3,577,225 A | 5/1971 | Shaffer et al. |
| 3,640,844 A | 2/1972 | Shank et al. |
| 3,660,227 A | 5/1972 | Ackroyd et al. |
| 3,660,228 A | 5/1972 | Magladry |
| 3,671,392 A | 6/1972 | Beaudoin et al. |
| 3,714,322 A | 1/1973 | Bell et al. |
| 3,736,227 A | 5/1973 | Nakazato |
| 3,801,734 A | 4/1974 | West |
| 3,814,667 A | 6/1974 | Klumb et al. |
| 3,847,736 A | 11/1974 | Bevilacqua |
| 3,853,703 A | 12/1974 | Anthony et al. |
| 3,859,165 A | 1/1975 | Radkowsky et al. |
| 3,956,147 A | 5/1976 | Becker et al. |
| 3,957,575 A | 5/1976 | Fauth |
| T947,011 I4 | 6/1976 | Radkowsky |
| 3,960,655 A | 6/1976 | Bohanan et al. |
| 3,971,575 A | 7/1976 | Lesham et al. |
| 3,998,692 A | 12/1976 | Bohanan et al. |
| 4,029,740 A | 6/1977 | Ervin, Jr. |
| 4,059,539 A | 11/1977 | Potter et al. |
| 4,072,564 A | 2/1978 | Jabsen |
| 4,077,835 A | 3/1978 | Bishop et al. |
| 4,078,967 A | 3/1978 | Anthony |
| 4,111,348 A | 9/1978 | Laird et al. |
| 4,119,563 A | 10/1978 | Kadner et al. |
| 4,192,716 A | 3/1980 | Anthony |
| 4,193,953 A | 3/1980 | Langen et al. |
| 4,194,948 A | 3/1980 | Ledin |
| 4,202,793 A | 5/1980 | Bezzi et al. |
| 4,235,669 A | 11/1980 | Burgess et al. |
| 4,268,357 A | 5/1981 | Formanek |
| 4,273,613 A | 6/1981 | Radkowsky |
| 4,278,501 A | 7/1981 | Steinke |
| 4,285,771 A | 8/1981 | Downs |
| 4,292,278 A | 9/1981 | Elikan et al. |
| 4,298,434 A | 11/1981 | Anthony et al. |
| 4,304,631 A | 12/1981 | Walton et al. |
| 4,309,251 A | 1/1982 | Anthony et al. |
| 4,320,093 A | 3/1982 | Volesky et al. |
| 4,324,618 A | 4/1982 | Schluderberg |
| 4,344,912 A | 8/1982 | Rampolla |
| 4,381,284 A | 4/1983 | Gjertsen |
| 4,393,510 A | 7/1983 | Lang et al. |
| RE31,583 E | 5/1984 | Klumb et al. |
| 4,450,016 A | 5/1984 | Vesterlund et al. |
| 4,450,020 A | 5/1984 | Vesterlund |
| 4,474,398 A | 10/1984 | Tolino et al. |
| 4,495,136 A | 1/1985 | Camden, Jr. et al. |
| 4,499,047 A | 2/1985 | Borrman et al. |
| 4,507,259 A * | 3/1985 | Cowell et al. ............ 376/173 |
| 4,508,679 A | 4/1985 | Matzner et al. |
| 4,540,545 A | 9/1985 | Kondo |
| 4,544,522 A | 10/1985 | Curulla et al. |
| 4,551,300 A | 11/1985 | Feutrel |
| 4,560,532 A | 12/1985 | Barry et al. |
| 4,572,816 A | 2/1986 | Gjertsen |
| 4,578,240 A | 3/1986 | Cadwell |
| 4,579,711 A | 4/1986 | Mishima et al. |
| 4,584,167 A | 4/1986 | Carelli |
| 4,587,078 A | 5/1986 | Azekura et al. |
| 4,589,929 A | 5/1986 | Steinberg |
| 4,615,862 A | 10/1986 | Huckestein |
| 4,645,642 A | 2/1987 | Leclercq et al. |
| 4,652,425 A | 3/1987 | Ferrari et al. |
| 4,659,538 A | 4/1987 | Leclercq |
| 4,664,880 A | 5/1987 | Bryan |
| 4,666,664 A | 5/1987 | Doshi |
| 4,670,213 A | 6/1987 | Wilson et al. |
| 4,671,924 A | 6/1987 | Gjertsen et al. |
| 4,671,927 A | 6/1987 | Alsop |
| 4,678,619 A | 7/1987 | Radkowsky |
| 4,678,627 A | 7/1987 | Rylatt |
| 4,678,632 A | 7/1987 | Ferrari |
| 4,680,443 A | 7/1987 | Vere et al. |
| 4,684,495 A | 8/1987 | Wilson et al. |
| 4,684,503 A | 8/1987 | Shallenberger |
| 4,692,304 A | 9/1987 | Gjertsen |
| 4,699,758 A | 10/1987 | Shallenberger et al. |
| 4,699,761 A | 10/1987 | Gjertsen et al. |
| 4,702,883 A | 10/1987 | Wilson et al. |
| 4,716,015 A | 12/1987 | Carlson |
| 4,746,488 A | 5/1988 | Pradal et al. |
| 4,749,519 A | 6/1988 | Koehly et al. |
| 4,762,676 A | 8/1988 | Gjertsen et al. |
| 4,765,909 A | 8/1988 | Rourke et al. |
| 4,818,474 A | 4/1989 | Malhouitre et al. |
| 4,820,473 A | 4/1989 | Ohashi et al. |
| 4,828,792 A | 5/1989 | Leclercq et al. |
| 4,832,905 A | 5/1989 | Bryan et al. |
| 4,842,814 A | 6/1989 | Takase et al. |
| 4,859,400 A | 8/1989 | Curzon |
| 4,879,086 A | 11/1989 | Luce et al. |
| 4,880,607 A | 11/1989 | Horton et al. |
| 4,900,507 A | 2/1990 | Shallenberger et al. |
| 4,918,710 A | 4/1990 | Bard |
| 4,938,921 A | 7/1990 | Mardon et al. |
| 4,942,016 A | 7/1990 | Marlowe et al. |
| 4,954,293 A | 9/1990 | Cailly et al. |
| 4,957,695 A | 9/1990 | Rudolph |
| 4,968,476 A | 11/1990 | Radkowsky |
| 4,986,957 A | 1/1991 | Taylor |
| 4,986,960 A | 1/1991 | Larson |
| 4,997,596 A | 3/1991 | Proebstle et al. |
| 5,002,726 A | 3/1991 | Johansson |
| 5,009,837 A | 4/1991 | Nguyen et al. |
| 5,009,839 A * | 4/1991 | King ............ 376/352 |
| 5,019,327 A | 5/1991 | Fanning et al. |
| 5,019,333 A | 5/1991 | Isobe et al. |
| 5,024,426 A | 6/1991 | Busch et al. |
| 5,024,807 A | 6/1991 | Hatfield et al. |
| 5,024,809 A | 6/1991 | Taylor |
| 5,024,810 A | 6/1991 | Bachman |
| 5,026,516 A | 6/1991 | Taylor |

(56) References Cited

U.S. PATENT DOCUMENTS

| | | |
|---|---|---|
| 5,030,412 A | 7/1991 | Yates et al. |
| 5,032,351 A | 7/1991 | Johansson |
| 5,035,869 A | 7/1991 | Furuya |
| 5,037,605 A | 8/1991 | Riordan, III |
| 5,053,191 A | 10/1991 | Bryan et al. |
| 5,069,864 A | 12/1991 | Johansson |
| 5,073,336 A | 12/1991 | Taylor |
| 5,085,827 A | 2/1992 | Johansson et al. |
| 5,089,210 A | 2/1992 | Reese et al. |
| 5,089,220 A | 2/1992 | Nylund |
| 5,089,221 A | 2/1992 | Johansson et al. |
| 5,091,145 A | 2/1992 | Petit |
| 5,093,075 A | 3/1992 | Chevereau et al. |
| 5,094,802 A | 3/1992 | Riordan, III |
| 5,110,539 A | 5/1992 | Perrotti et al. |
| 5,112,571 A | 5/1992 | Orii et al. |
| 5,135,710 A | 8/1992 | Grattier et al. |
| 5,135,728 A | 8/1992 | Karraker |
| 5,136,619 A | 8/1992 | Capossela et al. |
| 5,141,701 A | 8/1992 | Bryan |
| 5,147,597 A | 9/1992 | Roofthooft et al. |
| 5,147,600 A | 9/1992 | Kadono et al. |
| 5,149,491 A | 9/1992 | Congdon et al. |
| 5,164,050 A | 11/1992 | Bertaud et al. |
| 5,183,629 A | 2/1993 | Canat et al. |
| 5,186,891 A | 2/1993 | Johansson et al. |
| 5,188,797 A | 2/1993 | Bryan |
| 5,192,495 A | 3/1993 | Caldwell et al. |
| 5,194,216 A | 3/1993 | McDaniels, Jr. |
| 5,200,142 A | 4/1993 | DeMario et al. |
| 5,202,085 A | 4/1993 | Aoyama et al. |
| 5,209,899 A | 5/1993 | Johansson et al. |
| 5,211,908 A | 5/1993 | Verdier |
| 5,219,519 A | 6/1993 | Matzner |
| 5,221,515 A | 6/1993 | Thiebaut et al. |
| 5,223,211 A | 6/1993 | Inagaki et al. |
| 5,241,570 A | 8/1993 | Challberg |
| 5,243,635 A | 9/1993 | Bryan |
| 5,247,550 A | 9/1993 | Perkins et al. |
| 5,259,009 A | 11/1993 | Patterson et al. |
| 5,259,010 A | 11/1993 | Brown et al. |
| 5,263,071 A | 11/1993 | Farkas et al. |
| 5,265,139 A | 11/1993 | Yanagi et al. |
| 5,267,291 A | 11/1993 | Matzner et al. |
| 5,271,053 A | 12/1993 | Bryan |
| 5,272,741 A | 12/1993 | Masuhara et al. |
| 5,272,742 A | 12/1993 | Attix et al. |
| 5,274,685 A | 12/1993 | Yates |
| 5,276,721 A | 1/1994 | Beuerlein |
| 5,278,882 A | 1/1994 | Garde et al. |
| 5,278,883 A | 1/1994 | Patterson et al. |
| 5,282,231 A | 1/1994 | Adams et al. |
| 5,283,812 A | 2/1994 | Verdier |
| 5,283,821 A | 2/1994 | Karoutas |
| 5,286,946 A | 2/1994 | Bryan et al. |
| 5,289,514 A | 2/1994 | Lippert et al. |
| 5,297,176 A | 3/1994 | Altman et al. |
| 5,297,177 A | 3/1994 | Inagaki et al. |
| 5,299,246 A | 3/1994 | Bryan |
| 5,301,218 A | 4/1994 | Taylor, Jr. et al. |
| 5,307,393 A | 4/1994 | Hatfield |
| 5,328,524 A | 7/1994 | Hertz |
| 5,340,447 A | 8/1994 | Bertaud et al. |
| 5,341,407 A | 8/1994 | Rosenbaum et al. |
| 5,345,483 A | 9/1994 | Johansson et al. |
| 5,347,560 A | 9/1994 | Lippert et al. |
| 5,349,618 A | 9/1994 | Greenspan |
| 5,373,541 A | 12/1994 | Mardon et al. |
| 5,375,154 A | 12/1994 | Matzner et al. |
| 5,377,246 A | 12/1994 | Taylor, Jr. et al. |
| 5,383,228 A | 1/1995 | Armijo et al. |
| 5,384,814 A | 1/1995 | Matzner et al. |
| 5,386,439 A | 1/1995 | Leroy et al. |
| 5,386,440 A | 1/1995 | Kashiwai et al. |
| 5,390,220 A | 2/1995 | Zuloaga, Jr. et al. |
| 5,390,221 A | 2/1995 | Dix et al. |
| 5,390,222 A | 2/1995 | Rau et al. |
| 5,403,565 A | 4/1995 | Delloye et al. |
| 5,404,383 A | 4/1995 | Nylund |
| 5,417,780 A | 5/1995 | Adamson et al. |
| 5,420,901 A | 5/1995 | Johansson |
| 5,420,902 A | 5/1995 | Dressel et al. |
| 5,434,897 A | 7/1995 | Davies |
| 5,434,898 A | 7/1995 | Barkhurst |
| 5,436,946 A | 7/1995 | Curulla et al. |
| 5,436,947 A | 7/1995 | Taylor |
| 5,437,747 A | 8/1995 | Adamson et al. |
| 5,438,598 A | 8/1995 | Attix |
| 5,440,599 A | 8/1995 | Rodack et al. |
| 5,444,748 A | 8/1995 | Beuchel et al. |
| 5,452,334 A | 9/1995 | Reparaz et al. |
| 5,469,481 A | 11/1995 | Adamson et al. |
| 5,473,650 A | 12/1995 | Johansson |
| 5,481,577 A | 1/1996 | Yates et al. |
| 5,481,578 A | 1/1996 | Matzner |
| 5,483,564 A | 1/1996 | Matzner et al. |
| 5,488,634 A | 1/1996 | Johansson et al. |
| 5,488,644 A | 1/1996 | Johansson |
| 5,490,189 A | 2/1996 | Schechter |
| 5,490,190 A | 2/1996 | Hopkins et al. |
| 5,517,540 A | 5/1996 | Marlowe et al. |
| 5,517,541 A | 5/1996 | Rosenbaum et al. |
| 5,519,745 A | 5/1996 | Proebstle et al. |
| 5,519,746 A | 5/1996 | Dalke et al. |
| 5,519,748 A | 5/1996 | Adamson et al. |
| 5,524,032 A | 6/1996 | Adamson et al. |
| 5,526,387 A | 6/1996 | Johansson et al. |
| 5,528,640 A | 6/1996 | Johansson et al. |
| 5,530,729 A | 6/1996 | Gustafsson |
| 5,538,701 A | 7/1996 | Avens et al. |
| 5,539,791 A | 7/1996 | Garzarolli et al. |
| 5,539,792 A | 7/1996 | Buttner et al. |
| 5,539,793 A | 7/1996 | Johansson et al. |
| 5,546,437 A | 8/1996 | Matzner et al. |
| 5,572,560 A | 11/1996 | Brown |
| 5,577,081 A | 11/1996 | Yaginuma |
| 5,578,145 A | 11/1996 | Adamson et al. |
| 5,596,615 A | 1/1997 | Nakamura et al. |
| 5,600,694 A | 2/1997 | Broders |
| 5,606,724 A | 2/1997 | Wai et al. |
| 5,609,697 A | 3/1997 | Moinard et al. |
| 5,618,356 A | 4/1997 | Adamson et al. |
| 5,620,536 A | 4/1997 | Dahlback |
| 5,622,574 A | 4/1997 | Charquet |
| 5,648,995 A | 7/1997 | Mardon et al. |
| 5,666,389 A | 9/1997 | Andersson et al. |
| 5,674,330 A | 10/1997 | Charquet et al. |
| 5,675,621 A | 10/1997 | Croteau et al. |
| 5,681,404 A | 10/1997 | Adamson et al. |
| 5,699,396 A | 12/1997 | Taylor |
| 5,702,544 A | 12/1997 | Mardon et al. |
| 5,711,826 A | 1/1998 | Nordstrom |
| 5,726,418 A | 3/1998 | Duthoo |
| 5,727,039 A | 3/1998 | Harmon et al. |
| 5,732,116 A | 3/1998 | Petit |
| 5,737,375 A | 4/1998 | Radkowsky |
| 5,740,218 A | 4/1998 | Frederickson et al. |
| 5,748,694 A | 5/1998 | King |
| 5,768,332 A | 6/1998 | Van Swam |
| 5,774,514 A | 6/1998 | Rubbia |
| 5,774,517 A | 6/1998 | Palavecino et al. |
| 5,778,035 A | 7/1998 | Nylund |
| 5,787,142 A | 7/1998 | Van Swam |
| 5,808,271 A | 9/1998 | Duthoo |
| 5,826,163 A | 10/1998 | Saraceno et al. |
| 5,832,050 A | 11/1998 | Rebeyrolle et al. |
| 5,838,753 A | 11/1998 | Van Swam et al. |
| 5,844,957 A | 12/1998 | Johannesson et al. |
| 5,852,645 A | 12/1998 | Romary et al. |
| 5,854,818 A | 12/1998 | Van Swam et al. |
| 5,859,887 A | 1/1999 | Richards |
| 5,864,593 A | 1/1999 | Radkowsky |
| 5,892,807 A | 4/1999 | Van Swam |
| 5,901,193 A | 5/1999 | Dahlback et al. |

(56) References Cited

U.S. PATENT DOCUMENTS

| | | | |
|---|---|---|---|
| 5,926,517 A | 7/1999 | Van Swam | |
| 5,940,464 A | 8/1999 | Mardon et al. | |
| 5,949,837 A | 9/1999 | Radkowsky | |
| 5,949,839 A | 9/1999 | Nylund | |
| 6,002,735 A | 12/1999 | Van Swam | |
| 6,010,671 A | 1/2000 | Kimura | |
| 6,026,136 A * | 2/2000 | Radkowsky | 376/173 |
| 6,033,493 A | 3/2000 | Hertz et al. | |
| 6,110,437 A | 8/2000 | Schall et al. | |
| 6,130,927 A | 10/2000 | Kang et al. | |
| 6,167,105 A | 12/2000 | Yoon et al. | |
| 6,192,098 B1 | 2/2001 | Van Swam | |
| 6,205,196 B1 | 3/2001 | Yamashita et al. | |
| 6,226,342 B1 | 5/2001 | Micko et al. | |
| 6,228,337 B1 | 5/2001 | Ioffe | |
| 6,229,868 B1 | 5/2001 | Nylund et al. | |
| 6,236,702 B1 | 5/2001 | Chun et al. | |
| 6,243,433 B1 | 6/2001 | Adamson et al. | |
| 6,278,757 B1 | 8/2001 | Yokomizo et al. | |
| 6,278,759 B1 | 8/2001 | Yoon et al. | |
| 6,310,931 B1 | 10/2001 | Gustafsson et al. | |
| 6,320,924 B1 | 11/2001 | Croteau | |
| 6,327,324 B2 | 12/2001 | Nylund | |
| 6,339,205 B1 | 1/2002 | Nakayama | |
| 6,385,271 B2 | 5/2002 | Nylund | |
| 6,393,087 B1 | 5/2002 | Oh et al. | |
| 6,400,788 B1 | 6/2002 | Hirano et al. | |
| 6,421,407 B1 | 7/2002 | Kang et al. | |
| 6,429,403 B1 | 8/2002 | Nakayama | |
| 6,434,209 B1 | 8/2002 | Groeneveld et al. | |
| 6,473,482 B1 | 10/2002 | Steinke | |
| 6,488,783 B1 | 12/2002 | King et al. | |
| 6,516,043 B1 | 2/2003 | Chaki et al. | |
| 6,519,309 B1 | 2/2003 | Van Swam | |
| 6,522,710 B2 | 2/2003 | Smith et al. | |
| 6,539,073 B1 | 3/2003 | Smith et al. | |
| 6,542,566 B2 | 4/2003 | Adamson et al. | |
| 6,542,567 B1 | 4/2003 | Mayet et al. | |
| 6,544,361 B1 | 4/2003 | Diz et al. | |
| 6,608,880 B2 | 8/2003 | Smith et al. | |
| 6,608,881 B2 | 8/2003 | Oh et al. | |
| 6,621,885 B2 | 9/2003 | Brichet | |
| 6,665,366 B2 | 12/2003 | Aujollet et al. | |
| 6,690,758 B1 | 2/2004 | Elkins | |
| 6,707,872 B2 | 3/2004 | Yoon et al. | |
| 6,714,619 B2 | 3/2004 | Oh et al. | |
| 6,721,384 B2 | 4/2004 | Oh et al. | |
| 6,728,329 B2 | 4/2004 | Hirano et al. | |
| 6,744,842 B2 | 6/2004 | Schmidt et al. | |
| 6,758,917 B2 | 7/2004 | King et al. | |
| 6,807,246 B1 | 10/2004 | Kim et al. | |
| 6,819,733 B2 | 11/2004 | Hatfield et al. | |
| 6,845,138 B2 | 1/2005 | Chun et al. | |
| 6,847,695 B2 | 1/2005 | Kageyama et al. | |
| 6,863,745 B1 | 3/2005 | Charquet et al. | |
| 6,884,304 B1 | 4/2005 | Charquet | |
| 6,888,911 B2 | 5/2005 | Stabel-Weinheimer et al. | |
| 6,888,912 B2 | 5/2005 | Morel et al. | |
| 6,901,128 B2 | 5/2005 | Mori et al. | |
| 6,909,766 B2 | 6/2005 | Kido et al. | |
| 6,925,138 B2 | 8/2005 | Nakamaru et al. | |
| 6,934,350 B1 | 8/2005 | Challberg et al. | |
| 6,943,315 B2 | 9/2005 | Cho et al. | |
| 6,960,326 B1 | 11/2005 | Webb et al. | |
| 6,991,731 B2 | 1/2006 | Koegler | |
| 7,037,390 B2 | 5/2006 | Miyahara et al. | |
| 7,085,340 B2 | 8/2006 | Goldenfield et al. | |
| 7,087,206 B2 | 8/2006 | Bond et al. | |
| 7,127,024 B2 | 10/2006 | Garzarolli et al. | |
| 7,169,370 B2 | 1/2007 | Mesmin et al. | |
| 7,192,563 B2 | 3/2007 | Singh et al. | |
| 7,195,745 B2 | 3/2007 | Brandel et al. | |
| 7,309,473 B2 | 12/2007 | Caranoni et al. | |
| 7,323,153 B2 | 1/2008 | Amamoto et al. | |
| 2002/0080908 A1 | 6/2002 | Nakamaru et al. | |
| 2002/0122762 A1 | 9/2002 | Fukasawa et al. | |
| 2003/0026381 A1 | 2/2003 | Ukai et al. | |
| 2005/0031067 A1 | 2/2005 | Mori et al. | |
| 2005/0069075 A1 | 3/2005 | D'Auvergne | |
| 2005/0105677 A1 | 5/2005 | Yoon et al. | |
| 2005/0157836 A1 | 7/2005 | Broach et al. | |
| 2005/0226358 A1 | 10/2005 | Bonnamour et al. | |
| 2005/0238131 A1 | 10/2005 | Hellandbrand, Jr. et al. | |
| 2006/0045231 A1 | 3/2006 | Lee et al. | |
| 2006/0153327 A1* | 7/2006 | Jiang | 376/438 |
| 2006/0171498 A1 | 8/2006 | D'Auvergne | |
| 2006/0233685 A1 | 10/2006 | Janes | |
| 2006/0251205 A1 | 11/2006 | Balog | |
| 2006/0283790 A1 | 12/2006 | Elkins et al. | |
| 2007/0036260 A1 | 2/2007 | Fetterman et al. | |
| 2007/0080328 A1 | 4/2007 | Zavodchikov et al. | |
| 2007/0133734 A1 | 6/2007 | Fawcett et al. | |
| 2007/0165766 A1 | 7/2007 | Aleshin et al. | |
| 2007/0183556 A1 | 8/2007 | Labarriere et al. | |
| 2007/0201605 A1 | 8/2007 | Ishii et al. | |
| 2007/0206717 A1 | 9/2007 | Conner et al. | |
| 2007/0211843 A1 | 9/2007 | Smith, III et al. | |
| 2007/0242793 A1 | 10/2007 | Song et al. | |
| 2008/0013667 A1 | 1/2008 | Oh et al. | |
| 2008/0130820 A1 | 6/2008 | Ukai et al. | |
| 2008/0144762 A1 | 6/2008 | Holden et al. | |
| 2008/0152068 A1 | 6/2008 | Aktas et al. | |
| 2008/0152069 A1 | 6/2008 | Aktas et al. | |
| 2008/0179042 A1 | 7/2008 | Evans et al. | |
| 2009/0252278 A1* | 10/2009 | Bashkirtsev et al. | 376/412 |
| 2013/0322591 A1 | 12/2013 | Bashkirtsev et al. | |

FOREIGN PATENT DOCUMENTS

| | | |
|---|---|---|
| CN | 1351352 A | 5/2002 |
| CN | 1945751 A | 4/2007 |
| CN | 101299351 A | 11/2008 |
| DE | 1464481 | 1/1969 |
| DE | 1514124 | 9/1969 |
| EP | 0080853 | 6/1983 |
| EP | 0620558 | 4/1994 |
| EP | 0871958 | 10/1998 |
| EP | 0871958 A2 | 10/1998 |
| EP | 2 372 717 A1 | 10/2011 |
| FR | 1444002 | 7/1966 |
| FR | 2632657 | 12/1989 |
| GB | 853511 | 11/1960 |
| GB | 876 399 A | 8/1961 |
| GB | 876399 A | 8/1961 |
| GB | 887713 A | 1/1962 |
| GB | 904 140 A | 8/1962 |
| GB | 920343 | 3/1963 |
| GB | 1 031 678 A | 6/1966 |
| GB | 1043782 | 9/1966 |
| GB | 1068964 | 5/1967 |
| GB | 1 126 396 A | 9/1968 |
| GB | 1 287 767 A | 7/1972 |
| GB | 2229172 | 9/1990 |
| JP | S38-005344 B | 5/1963 |
| JP | S39-009943 | 6/1964 |
| JP | S41-002279 B | 2/1966 |
| JP | S41-021399 B | 12/1966 |
| JP | S42-012028 | 7/1967 |
| JP | S43-020223 | 8/1968 |
| JP | 58-021194 A | 2/1983 |
| JP | 58-0187891 A | 11/1983 |
| JP | 59-23830 | 2/1984 |
| JP | 63-134520 | 6/1988 |
| JP | 2018328 | 1/1990 |
| JP | 2221893 | 11/1990 |
| JP | 3094195 | 4/1991 |
| JP | 11-183674 A | 7/1999 |
| JP | 11-508367 A | 7/1999 |
| JP | H11508367 A | 7/1999 |
| JP | H11-511553 A | 10/1999 |
| JP | 11-352272 A | 12/1999 |
| JP | 2001-500265 A | 1/2001 |
| JP | 2002-122687 A | 4/2002 |
| JP | 2002-122687 A | 4/2002 |

(56) References Cited

FOREIGN PATENT DOCUMENTS

| | | |
|---|---|---|
| JP | 2003-248079 | 9/2003 |
| JP | 2004-20463 | 1/2004 |
| JP | 2007-507700 A | 3/2007 |
| JP | 2007-507702 A | 3/2007 |
| JP | 2008-170454 A | 7/2008 |
| JP | 04-303796 B2 | 7/2009 |
| KR | 10-2010-0129798 A | 12/2010 |
| RU | 2170956 C1 | 7/2001 |
| RU | 2176826 | 12/2001 |
| RU | 2222837 | 1/2004 |
| RU | 2246142 | 2/2005 |
| RU | 2294570 | 2/2007 |
| RU | 2 389 089 C1 | 5/2010 |
| RU | 2389089 C1 | 5/2010 |
| RU | 2170956 | 7/2011 |
| WO | 85/01826 | 4/1985 |
| WO | 93/16477 | 8/1993 |
| WO | 97/08711 | 6/1997 |
| WO | WO-2009/082254 A1 | 7/2009 |
| WO | WO-2010/074592 A1 | 7/2010 |
| WO | WO-2011/143293 A1 | 11/2011 |

OTHER PUBLICATIONS

European Search Report from corresponding Patent Application EP08172834 mailed Aug. 19, 2009.
European Search Report in related application No. EP 10 16 6457 mailed Aug. 11, 2010.
International Search Report from Russian Patent Office in corresponding Patent Application PCT/RU2008/000801 mailed Sep. 3, 2009.
International Preliminary Report on Patentability in corresponding Patent Application PCT/RU2008/000801 issued on Jul. 5, 2011.
Diakov, C., Feasibility of converting Russian icebreaker reactors from HEU to LEU fuel, Science and Global Security, vol. 14, pp. 33-48, 2006, Routledge Taylor & Francis Group.
Halber D., et al., Energy Futures, MIT energy Initiative, 2009, ISSN 1942-4671, Massachusetts Institute of Technology., pp. 5-7.
J. Buongiorno et al., Core Design Options for High Power Density BWRs (MIT-NFC-PR-089), Nuclear Fuel Cycle (NFC) Technology and Policy Program, Dec. 2006.
J. Buongiorno et al., Core Design Options for High Power Density BWRs (MIT-NFC-PR-097), Nuclear Fuel Cycle (NFC) Technology and Policy Program, Nov. 2007.
J. Buongiorno et al., Core Design Options for High Power Density BWRs (CANES-NFC-PR-102), Nuclear Fuel Cycle (NFC) Technology and Policy Program, Sep. 2008.
D. Carpenter et al., High Performance Fuel Design for Next Generation PWRs: Final Report (MIT-NFC-PR-082), Nuclear Fuel Cycle (NFC) Technology and Policy Program, Jan. 2006.
Supplementary European Search Report dated Apr. 16, 2013 of EP Appl No. 08879222.1 (8 pages).
Chinese Office Action dated Aug. 19, 2013 of Chinese Application No. 200880132741.8 filed.
Japanese Application Office Action dated Oct. 1, 2013 of Japanese Application No. 2011-543460 (8 pages).
International Search Report and Written Opinion from PCT/US2011/036034 mailed Sep. 21, 2011.
V. V. Bol'Shakov et al. "Experimental study of burnout in channels with twisted fuel rods," Thermal Engineering, vol. 54, No. 5, May 1, 2007, pp. 386-389.
Chinese Office Action issued Aug. 19, 2013 in related Chinese Patent Application No. 200880132741.8.
Japanese Office Action issued Oct. 1, 2013 in related Japanese Patent Application No. 2011-543460.
Examination Report issued on Sep. 17, 2013 in related Australian Application No. 2008365658.
Korean Office Action issued on Feb. 25, 2014 in related Korean Patent Application No. 10-2010-7026035.
Korean Office Action issued on Feb. 25, 2014 in related Korean Patent Application No. 10-2010-7016627.
Canadian Office Action issued Mar. 12, 2014 in related Canadian Patent Application No. 2,710,432.
Examination Report issued Feb. 14, 2014 in related Australian Patent Application No. 2011250906.
International Preliminary Report on Patentability issued in International Application No. PCT/US2011/035859 dated Nov. 22, 2012.
International Preliminary Report on Patentability issued in International Application No. PCT/US2012/020878 dated Jul. 25, 2013.
Reasons for Rejection issued Dec. 24, 2014 in Korean Patent Application No. 10-2011-7016736.
Notice of Reasons for Rejection issued Feb. 3, 2015 in Japanese Patent Application No. 2013-510271.
Translation of Examination Report Issued Jan. 20, 2015 in Ukranian Patent Application No. a201213992.
Notice of Reasons for Rejection and Organized Translation issued Nov. 4, 2015 in Japanese Patent Application No. 2013-510271.
Notice of Reasons for Rejection issued Oct. 7, 2014 in related Japanese Patent Application No. 2011-543460.
International Search Report and Written Opinion issued Sep. 15, 2014 in International Patent Application No. PCT/US2014/036437.
Decision for Grant and Partial English Translation issued Apr. 28, 2015 in Japanese Patent Application No. 2011-543460.
International Search Report issued Feb. 10, 2016 in International Patent Application No. PCT/US2015/050454.
Written Opinion issued Feb. 10, 2016 in International Patent Application No. PCT/US2015/050454.
Notice of Allowance issued Feb. 22, 2016 in Chinese Patent Application No. 201180023785.9.
Decision of Grant (and partial English translation) issued Mar. 15, 2016 in Japanese Patent Application No. 2014-114955.
Notice of Reasons for Rejection with Organized English Translation issued Mar. 15, 2016 in Japanese Patent Application No. 2015-094071.

* cited by examiner

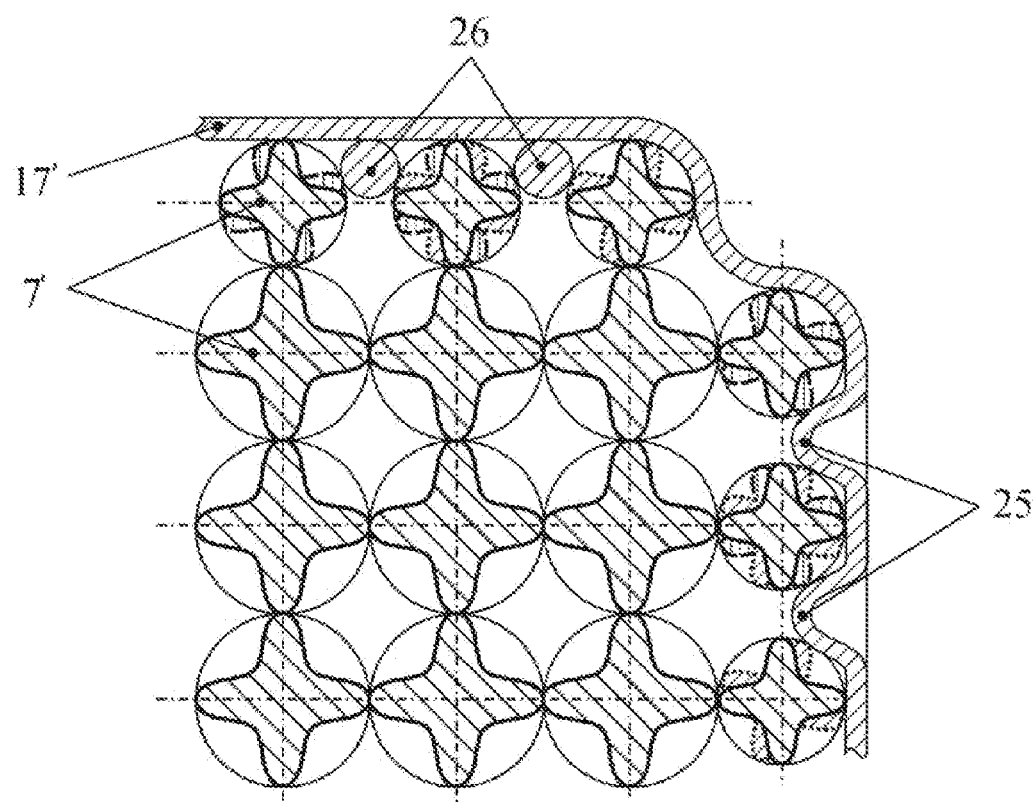
FIG. 5
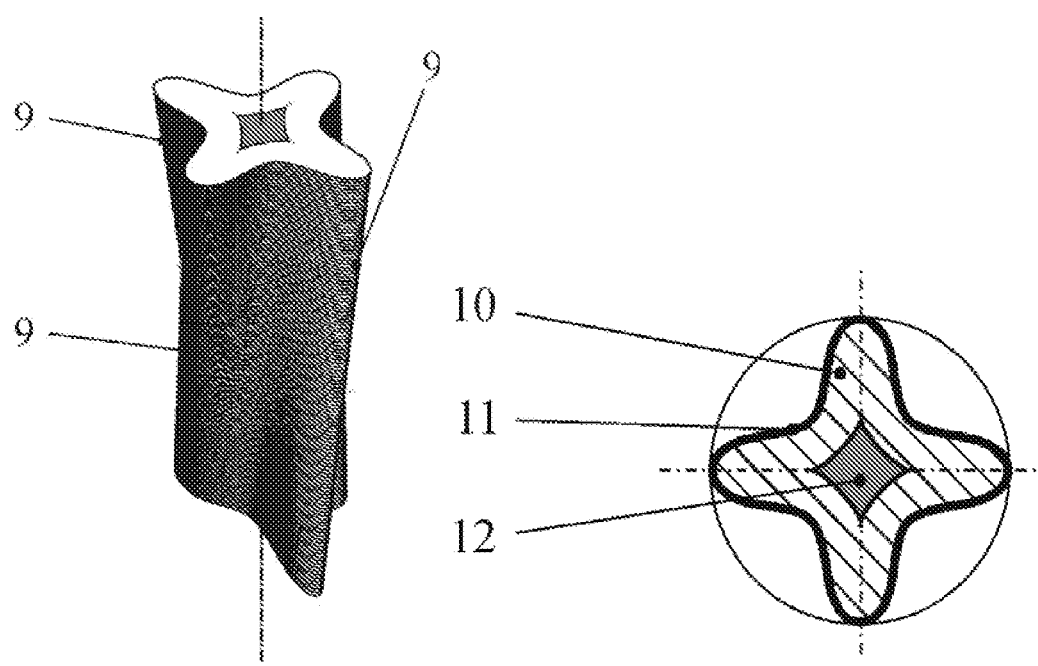
FIG. 6          FIG. 7

LIGHT-WATER REACTOR FUEL ASSEMBLY (ALTERNATIVES), A LIGHT-WATER REACTOR, AND A FUEL ELEMENT OF FUEL ASSEMBLY

CROSS REFERENCE TO RELATED APPLICATIONS

This is the U.S. National Phase of PCT/RU2008/0000801, filed Jan. Dec. 25, 2008, which is incorporated by reference herein in its entirety.

PERTINENT ART

The invention in general falls into the category of the structural elements of light-water nuclear reactors in which thorium is used as the fuel, and in particular, into the category of the structural elements of the jacketless fuel assemblies in the shape of a square from which the cores of water-cooled, water-moderated power reactors are formed, which are known as reactors of the PWR type (for example, the AP-1000, the EPR, etc.).

PRIOR KNOWLEDGE

Nuclear power is still an essential energy resource around the world today. Many countries that do not have adequate fossil fuel resources primarily rely on nuclear power to generate electricity. In many other countries, nuclear power is used as a competing source for the generation of electricity, which also increases the diversity of the types of energy used. In addition, nuclear power also makes a very significant contribution to the achievement of goals such as the management of the environmental pollution associated with fossil fuel (for example, acid rain and global warming) and the preservation of fossil fuel for future generations.

Despite the fact that safety is unequivocally the principal issue surrounding the design and operation of nuclear reactors, another key issue includes of the danger of the proliferation of materials that can be used in nuclear weapons. This is especially true for countries with unstable governments, the possession of nuclear weapons by which might pose a considerable threat to the world security. For this reason, nuclear power must be generated and used in such a manner that it does not lead to the proliferation of nuclear weapons and the resulting risk of their use.

All the nuclear reactors in existence at this time produce a large quantity of a material that is customary to call it reactor-grade plutonium. For example, a conventional 1,000-megawatt (MW) reactor generates in the magnitude of 200-300 kilograms (kg) of reactor-grade plutonium a year that might be suitable for making nuclear weapons. Thus, the fuel discharged from the cores of conventional reactors is an intensely multiplying material and requires precautionary measures in order to ensure that the discharged fuel does not fall into the hands of individuals who do not have the right to possess it. A similar security problem also exists relative to the enormous stockpiles of weapons-grade plutonium that are created in the United States of America (USA) and the countries of the former Union of Soviet Socialist Republics (USSR) when nuclear weapons were dismantled.

Another problem associated with the operation of conventional nuclear reactors stems from the ongoing need for long-lived radioactive waste disposal, as well as the rapid depletion of world resources of natural uranium raw materials.

In order to resolve these problems, attempts have recently been made to create nuclear reactors that operate on relatively small quantities of nonproliferative enriched uranium (enriched uranium has a U-235 content of 20% or less) and that do not produce significant quantities of multiplying materials such as plutonium. Examples of such reactors were disclosed in international applications WO 85/01826 and WO 93/16477, wherein reactors with a seed-and-breeding core containing a seed region and a breeding region are presented that derive a considerable percentage of their power from the breeding regions, with thorium serving as the fuel. The breeding regions encircle a seed region, within which fuel rods made from nonproliferative enriched uranium are located. The uranium in the seed region fuel rods emits neutrons that are captured by the thorium in the breeding regions, by virtue of which U-233, capable of nuclear fission, is created, which burns in situ and releases heat for the reactor power plant.

The use of thorium as a nuclear reactor fuel is appealing, since thorium reserves around the world significantly exceed uranium reserves. Furthermore, both reactors mentioned above are nonproliferative in the sense that neither the initially charged fuel nor the fuel discharged at the end of each fuel cycle is suitable for making nuclear weapons. This is achieved by virtue of the fact that only nonproliferative enriched uranium is used as the seed region fuel, during which moderator/fuel volume ratios are selected that result in the minimal formation of plutonium. And a small quantity of nonproliferative enriched uranium is added to the breeding region, within which the U-238 component is homogeneously mixed with the left over U-233 at the end of the breeding cycle and "denatures" the U-233 (alters its natural properties), as a result of which it becomes unsuitable for making nuclear weapons.

Unfortunately, neither of the reactor designs cited above is truly "nonproliferative." In particular, it was discovered that both these designs result in a level of proliferative plutonium formation in the seed region that exceeds the minimum possible level. The use of a round seed region with an internal or central breeding region and an external encircling breeding region cannot ensure the operation of a reactor as a "nonproliferative" reactor, since the thin round seed region has a correspondingly small "optical thickness", resulting in the fact that the seed region (of neutrons) spectrum will be dominant over the considerably harder spectrum of the internal and external breeding regions. This leads to the origination of a larger share of epithermal neutrons in the seed region, as well as to the production of multiplying plutonium, in a quantity larger than the minimum amount.

In addition, neither of these foregoing reactor designs has been optimized from the reference point of operating parameters. For example, the moderator/fuel volume ratios in the seed region and the breeding regions are especially critical for the production of a minimum quantity of plutonium in the seed region, in order to ensure an adequate amount of heat to be released from the fuel rods in the seed region and for the optimum conversion of thorium into U-233 in the breeding region. Research has shown that the preferred moderator/fuel ratio values, specified in these international applications, are too high in the seed regions and too low in the breeding regions.

The foregoing core designs were also not especially efficient when nonproliferative enriched uranium was used in the seed region fuel elements. As a result the fuel rods discharged at the end of each seed region fuel cycle, consequently contained so much leftover uranium that it was necessary to process them for reuse in another reactor core.

The reactor disclosed in application WO 93/16477 also requires a complicated reactor mechanical control circuit that makes it unsuitable for re-equipment of a conventional reactor core. Likewise, the core of the reactor disclosed in application WO 85/01826 cannot be easily transferred to a conventional core, since its design parameters are not compatible with those of a conventional core.

Finally, both foregoing reactor designs were specially conceived for burning nonproliferative enriched uranium with thorium and are not suitable for the use of a large quantity of plutonium. Accordingly, neither of these designs ensures the resolution of the problem of the stored accumulated plutonium.

A reactor is known from patent RU 2176826 with a core, includeing of a number of seed-and-blanket regions, each of which contains a central seed region. Every seed region includes fuel elements of the seed region, made from a material capable of nuclear fission that contains uranium-235 and uranium-238, a circular breeding region that surrounds the seed region. The reactor also includes of the breeding fuel elements of the breeding region, which primarily contain thorium and enriched uranium in a volume of 10% or less, a feed region moderator, where the moderator/fuel volume ratio falls within a value range of 2.5 to 5.0, and a breeding region moderator, where the moderator/fuel ratio falls within a value range of 1.5-2.0. Herewith, each of the seed region fuel elements includes of a uranium-zirconium (U—Zr) alloy and the seed region comprises 25-40% of the total volume of each seed-and-blanket region.

The known reactor ensures the optimum operation from the standpoint of economy and is not "proliferative". This reactor can be used to consume large quantities of plutonium and thorium without simultaneously producing waste products that constitute proliferative materials. Herewith, the subject reactor generates considerably smaller quantities of highly radioactive waste products, as a result of which the need for long-term waste storage locations is diminished.

However, the seed-and-blanket regions employed in this reactor are not suitable for use in existing light-water reactors of the PWR type cited above (for example, the AP-1000, the EPR, etc.).

A light-water reactor fuel assembly is known from the description for patent RU 2222837, which is similar to the previously described reactor, that has, in particular, a square-shaped cross-section that makes it possible to install this fuel assembly, made up of seed-and-blanket regions, in a conventional light-water reactor.

However, other than indicating the shape of the assembly's cross-section, the description for the patent cited above does not contain information on the assembly structural variations that would facilitate its installation in an existing light-water reactor of the PWR type (for example, the AP-1000, the EPR, etc.) without making changes of any kind in the reactor's design.

A light-water reactor fuel assembly is known from patent RU 2294570 that contains a fuel element bundle, guide tubes housed in spacer grids, a lower nozzle, and a upper nozzle, where the spacer grids are also interconnected to the lower nozzle by components positioned along the length of the fuel assembly, while the upper nozzle includes of upper and lower connected plates, a shell ring that is positioned between these plates, and a spring assembly; here, the upper nozzle shell ring is equipped with outer ribs, the protruding sections of which are interconnected by a rim and the lower section of which are interconnected by perforated plates.

The known fuel assembly falls into the category of jacket-less fuel assembly designs, from which the cores of water-cooled, water-moderated power reactors of the VVER-1000 type are formed, and has enhanced performance properties due to the increased rigidity and decreased length of the upper nozzle, as well as an enlarged free space between the fuel element bundle and the upper nozzle, accompanied by a simultaneous increase in fuel element length. This makes it possible to increase fuel assembly's charging with a fuel that has a high burnup fraction and thus to increase reactor core power, as well as fuel assembly operating time.

However, all the fuel elements in this assembly are made from the fissile material traditionally used in light-water reactors; consequently, the shortcoming previously described is inherent in a reactor with assemblies of this type—the production of a large quantity of reactor-grade plutonium. Moreover, the subject assembly has been adapted for reactors of the VVER-1000 type; i.e., it has a hexagon-shaped cross-section, which does not match the shape of the fuel assemblies used in reactors of the PWR type (for example, the AP-1000, the EPR, etc.).

The objective of the invention includes of creating a fuel assembly that generates a considerable portion of its power in a breeding region that contains thorium as the fuel on the one hand and does not produce wastes that constitute proliferative materials during its use. On the other hand, it can be placed into an existing light-water reactor of the PWR type (for example, the AP-1000, the EPR, etc.) without the need for its substantial modification.

SUMMARY OF THE INVENTION

According to one embodiment of the invention, this objective is achieved by virtue of the fact that a light-water nuclear reactor fuel assembly with a square shape in the plan view contains a seed region including a bundle of seed fuel elements that are cross-sectionally arranged in the rows and columns of a square coordinate grid; herewith, each seed fuel element contains a kernel, which includes enriched uranium or plutonium, and a blanket region, which encircles the aforementioned seed region and contains a bundle of breeding fuel elements, each of which contains ceramic thorium; in this instance, the breeding fuel elements are cross-sectionally arranged in two in rows and columns of a square coordinate grid within two square-shaped rings.

The fuel assembly also contains guide tubes that are arranged within the seed region in such a manner as to match the position of the guide tubes for the fuel assembly control rods of a nuclear reactor of the PWR type, thereby ensuring their interchangeability. In particular, the fuel assembly contains 24 guide tubes that are arranged within the seed region in such a manner as to match the position of the 24 guide tubes for the 17×17 fuel assembly control rods of a nuclear reactor of the PWR type, thereby ensuring their interchangeability.

Each set of seed fuel elements has a four-lobed profile that forms spiral spacer ribs.

Predominantly the blanket region fuel elements within the fuel assembly cross-section are positioned in the two outmost rows and columns of a square coordinate grid made up of 19 rows and 19 columns, while the seed fuel elements are positioned in the rows and columns of a square coordinate grid made up of 13 rows and 13 columns.

Herewith, the fuel assembly contains a channel that has a square shape in the cross-section, and that separates the seed region fuel elements from the blanket region fuel elements. The seed region's lower nozzle is connected to the channel, to which a supporting frame structure is attached for the purpose of securing the seed fuel elements. In addition, a guiding grid is attached to the upper section of the channel in order to facilitate the placement of the seed fuel elements so as to make their free axial movement possible.

Predominantly the number of seed fuel elements is 144 items, while the number of breeding fuel elements is 132 items.

The blanket region contains a blanket region lower nozzle, lengthwise-arranged angle units, and several lengthwise-arranged poles; herewith, the blanket region lower nozzle is rigidly connected to the aforementioned angle units and poles, thereby forming a blanket region frame structure. In this instance, the number of angle units, like the number of poles, predominantly equals four.

Spacer grids are secured to the frame structure. In the central zone of each of the grids an opening is executed for housing the seed region therein.

The seed and blanket regions are interconnected by means of a locking mechanism that makes it possible to collectively insert these modules into a nuclear reactor's core and to extract them from the core as a single unit, as well as to ensure the possibility of separating the seed and blanket regions.

According to the other embodiment of the invention, this objective is achieved by virtue of the fact that in the fuel assembly, unlike its embodiment described above, the breeding fuel elements are cross-sectionally arranged in the rows and columns of a square coordinate grid within three square-shaped rings.

Herewith, some of the guide tubes are situated within the seed region, while the rest of the channels are situated with the blanket region; in this instance, all the guide tubes are arranged in such a manner as to match the position of the guide tubes for the fuel assembly control rods of a nuclear reactor of the PWR type, thereby ensuring their interchangeability.

According to the second embodiment of the fuel channel, the seed and blanket region fuel elements therein are cross-sectionally arranged in 17 rows and 17 columns of a square coordinate grid, during which the seed fuel elements are positioned in the midsection of this grid in 11 rows and 11 columns.

The fuel assembly in this embodiment, just like the assembly in the first embodiment, contains a channel that has a square cross-sectional shape and that separates the seed region fuel elements from the blanket region fuel elements. Here, 16 guide tubes are located inside the channel, while 8 are located outside it in such a manner as to match the position of the 24 control rods of a 17×17 fuel assembly of a nuclear reactor of the PWR type, thereby ensuring their interchangeability. The seed region's lower nozzle is also connected to the channel, to which a supporting frame structure is attached for the purpose of securing the seed fuel elements. In addition, a guiding grid is attached to the upper section of the channel in order to facilitate the placement of the seed fuel elements that makes their free axial movement possible.

In this embodiment of the fuel assembly, unlike the embodiment described above, the multitude of seed fuel elements includes a multitude of primary seed fuel elements that are cross-sectionally arranged in 9 rows and 9 columns of the midsection of a square coordinate grid, as well as a multitude of secondary seed fuel elements that are positioned in the outermost rows and columns of the square coordinate grid's midsection. At that each of the multitude of primary seed fuel elements has a larger width across corners than that of each of the secondary seed fuel elements. Herewith, the multitude of primary seed fuel elements contains 72 elements, while the multitude of secondary seed fuel elements contains 36 elements.

The secondary seed fuel elements in each of the two rows and each of the two columns of the seed region's cross-section are shifted toward the center of the channel, while devices for limiting the lateral movement of the seed fuel elements are located on the channel's interior surface between two adjacent secondary seed fuel elements in order to prevent the lateral displacement of the seed fuel elements. These devices may be fashioned in the form of raised areas on the seed region channel, or in the form of rods that are lengthwise-arranged within the channel.

The multitude of breeding fuel elements in this embodiment of the assembly includes 156 breeding fuel elements that are situated within the fuel assembly's cross-section in the three outermost rows and columns of the square coordinate grid.

The blanket region in this embodiment, just like one in the first embodiment, contains a blanket region lower nozzle; however, in the present embodiment, this lower nozzle is rigidly connected to guide tubes that are located in the blanket region so as to form a blanket region frame structure. Spacer grids are also secured to the frame structure. In the central zone of each of the grids an opening is executed for housing the seed region therein.

As in the assembly that corresponds to the first embodiment, the seed and blanket regions are interconnected by means of a locking mechanism that makes it possible to collectively insert these modules into a nuclear reactor's core and to extract them from the core as a single unit, as well as to ensure the possibility of separating the seed and blanket regions.

The dimensions and shape, as well as the neutronic and thermohydraulic properties, of the fuel assemblies that correspond to both the first and the second embodiments thereof, match the dimensions and shape, as well as the neutronic and thermohydraulic properties, of a traditional fuel assembly for a nuclear reactor of the PWR type, thereby ensuring their interchangeability. At that the output power of the fuel assembly, when it is placed into a nuclear reactor instead of a traditional fuel assembly for a nuclear reactor of the PWR type, without making any additional changes in the reactor's design, falls within the design range limits of a reactor intended to operate with traditional fuel assemblies.

According to the invention, this objective is also achieved by virtue of the fact that a nuclear reactor fuel assembly's fuel element contains a kernel, including enriched uranium or plutonium, and has a four-lobed profile. In addition to the kernel, the element contains a cladding that encircles the kernel. The profile's lobes form spiral spacer ribs; at that the axial twist pitch of the spiral spacer ribs ranges from 5% to 30% of the fuel element length. The cladding is made from a zirconium alloy; a displacer that has an almost square cross-sectional shape is positioned along the longitudinal axis of the kernel. The displacer is made from zirconium or an alloy thereof; the kernel is made from a uranium-zirconium (U—Zr) alloy with a uranium fraction of up to 30%; at that, the uranium is enriched up to 20% using a uranium-235 isotope. The kernel is made from a plutonium-zirconium (Pu—Zr) alloy with a power-grade plutonium fraction of up to 30%.

Furthermore, according to the invention, this objective is achieved by virtue of the fact that in a light-water reactor containing a multitude of fuel assemblies, at the very least, one or all of the fuel assemblies is executed in accordance with one embodiment of the invention or the other.

BRIEF DESCRIPTION OF THE DRAWINGS

The particularities and advantages of the invention at hand will be obvious from the following detailed description of its preferred embodiments taking the attached drawings into account, in which:

FIG. 5—a layout view of the location of the fuel elements in the peripheral region of the seed region that conforms to the second embodiment of the invention;

FIG. 6—a layout view in the perspective of a seed region fuel element;

FIG. 7—a cross-sectional layout view of a seed region fuel element;

DETAILED DESCRIPTION OF EMBODIMENTS OF THE INVENTION

Figure 1:
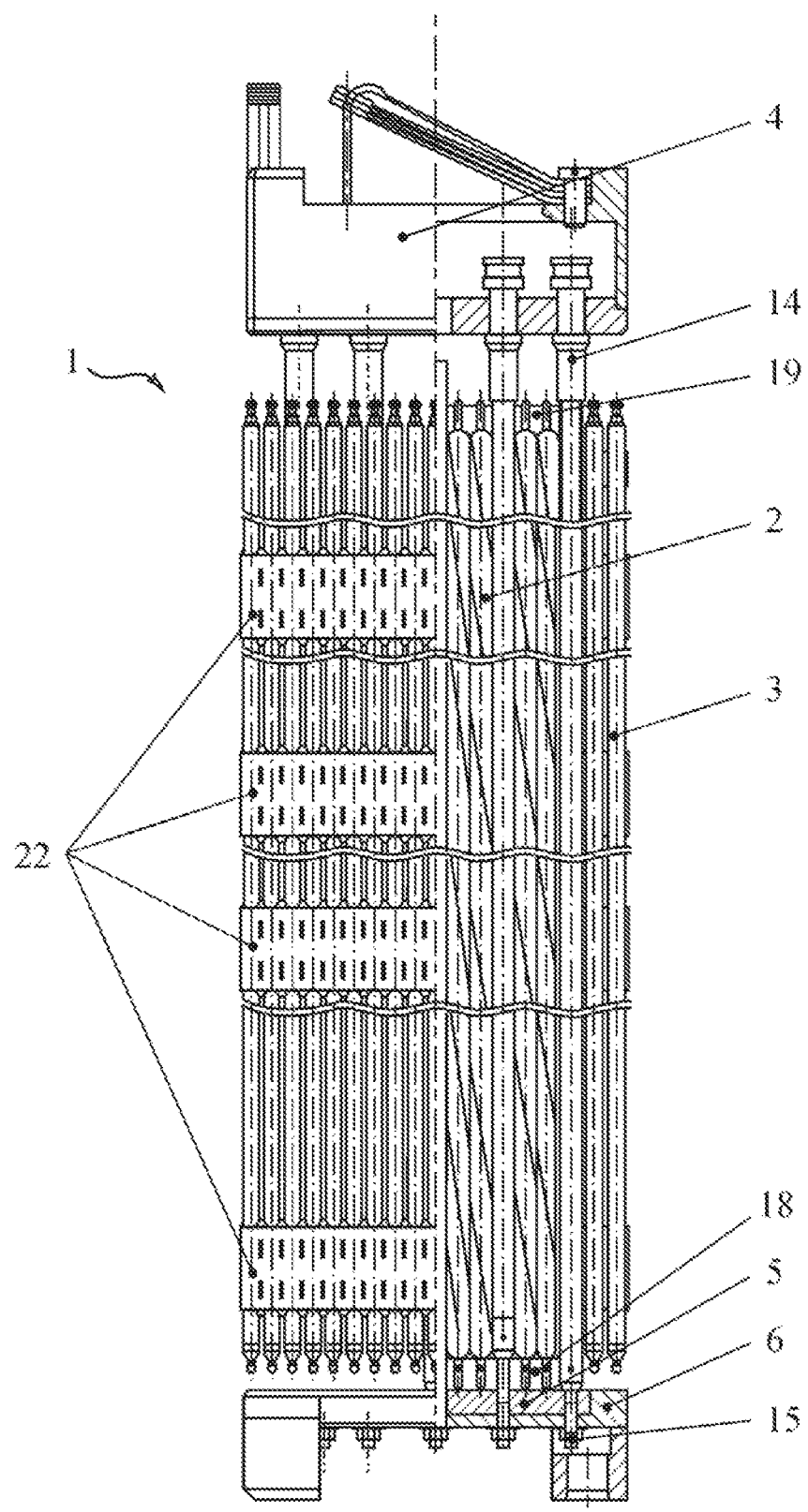
FIG. 1—offers a general view of a fuel assembly that conforms to the first embodiment of the invention.
Figure 2:
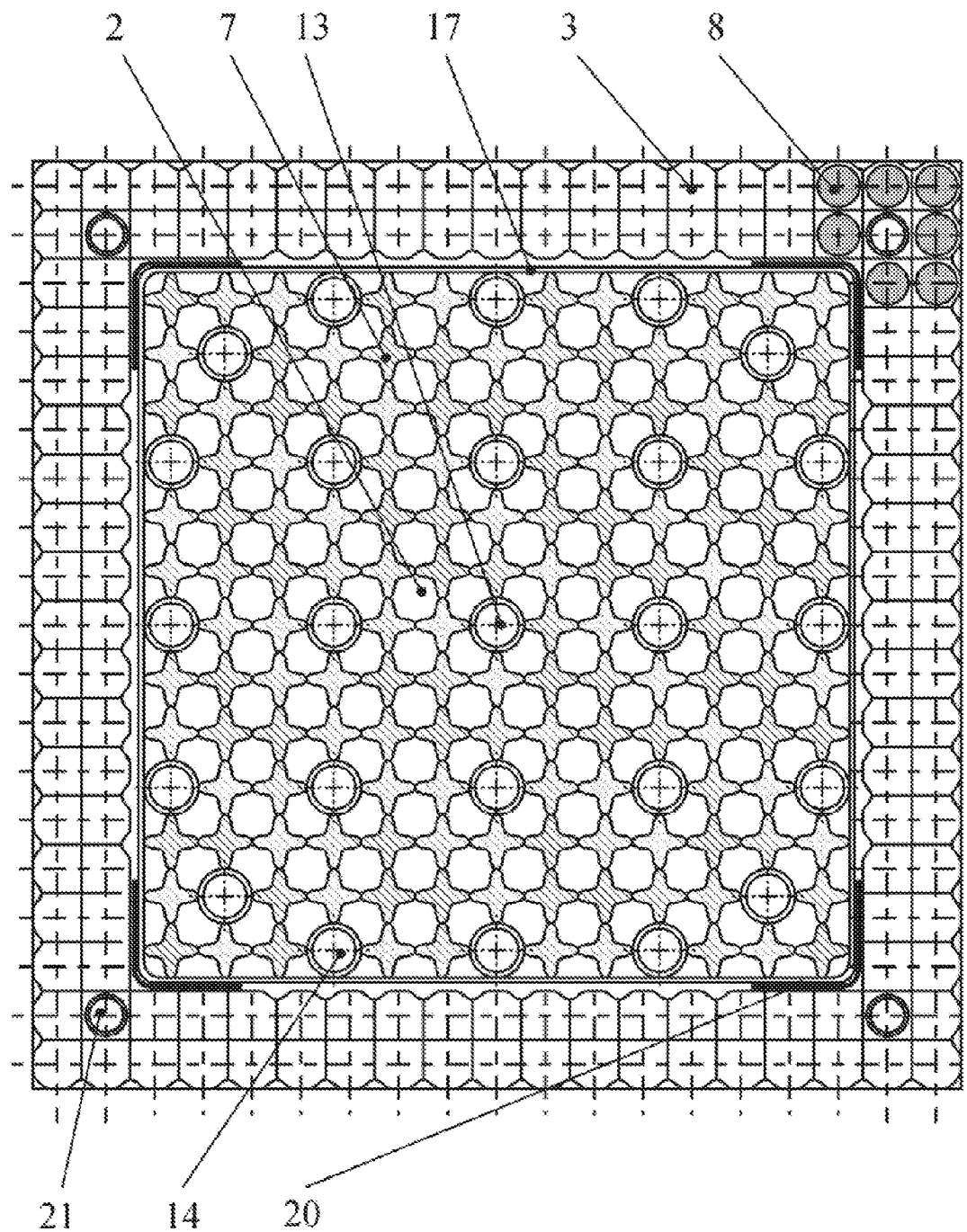
FIG. 2—a cross-sectional layout view of a fuel assembly that conforms to the first embodiment of the invention.

A fuel assembly designated as collective item 1 according to the first embodiment of the invention is shown in FIG. 1. Fuel assembly 1 contains a seed region 2, a blanket region 3, a upper nozzle 4, a seed region lower nozzle 5, and a blanket region lower nozzle 6. As shown in FIG. 2, seed region 2 contains fuel element bundle 7, while blanket region 3 contains fuel element bundle 8. Each of the fuel elements in bundle 7 has a four-lobed profile that forms spiral spacer ribs, 9 (FIG. 6), along the length of a fuel element and contains a kernel, 10 (FIG. 7), that includes enriched uranium or plutonium, as well as a cladding made from a zirconium alloy, 11, that encircles it. A displacer, 12, is located inside kernel 10. All the fuel elements 7 make contact with each adjacent fuel element in bundle 7 at the spiral spacer rib 9 contact points. The spiral spacer rib 9 contact points stand away from one another in the axial direction by a distance equal 25% of the spiral line pitch value.

Each of the fuel elements 8 has a round shape in the plan view and is made from thorium, with the addition of enriched uranium. The fuel elements module 7 and 8 are arranged in the rows and columns of a square coordinate grid in a cross-section, so that the fuel assembly as a whole has the shape of a square in the plan view. In particular, the fuel elements of module 7 are arranged in the rows of columns of a square coordinate grid, made up of 13 rows and 13 columns, while the fuel elements of blanket region 8 are positioned in the two outermost rows and columns of a square coordinate grid, made up of 19 rows and 19 columns.

The profiles of each fuel element of bundle 7 have an identical width across corners, amounting, for example, to 12.6 millimeters (mm). The number of fuel elements 7 is 144. The fuel elements 8 have an identical diameter, amounting to, for example, 8.6 millimeters (mm), and are positioned along the sides of the square in two rows and columns of a square coordinate grid. The number of fuel elements 8 is 132.

Figure 8:
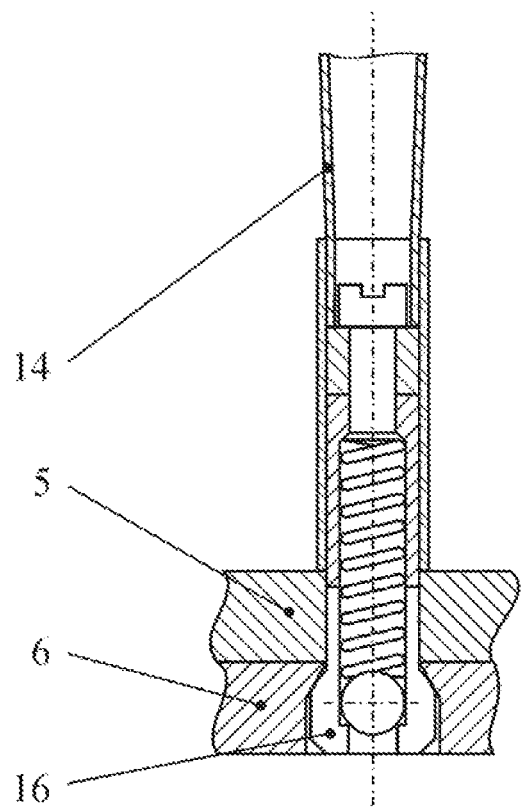
FIG. 8—a layout view of one version of the seed and blanket region lower nozzle connection.

A tube 13 is located in the center of seed region 2, which forms a guiding channel for housing the controls therein. Guide tubes 14 are located within the confines of seed region 2 for the insertion of the absorber rods and the safety rods, which are positioned in upper nozzle 4 so as to make axial shifting possible, in addition to which they are linked to lower nozzle 5 of seed region 2 and lower nozzle 6 of blanket region 3 by means of a threaded joint 15 or a collect fixture 16 (FIG. 8).

Fuel elements' bundle 7 of seed region 2 is encircled by a channel 17, which is secured in lower nozzle 5. The lower end sections of fuel elements' bundle 7 of the seed region 2 are positioned in a supporting frame structure, 18, while their upper end sections are positioned in a guiding grid, 19 (FIG. 1). A fuel element 7 of seed region 2 may be fabricated using the combined molding technique (extrusion through a female die) in the form of a single assembly unit. The spiral line pitch of the spiral spacer ribs, 9, was selected based on the condition of the mutual alignment of axes of adjacent fuel elements 7 at a distance equal to the cross-sectional width across corners of a fuel element and ranges from 5% to 30% of the fuel element's length.

Figure 9:
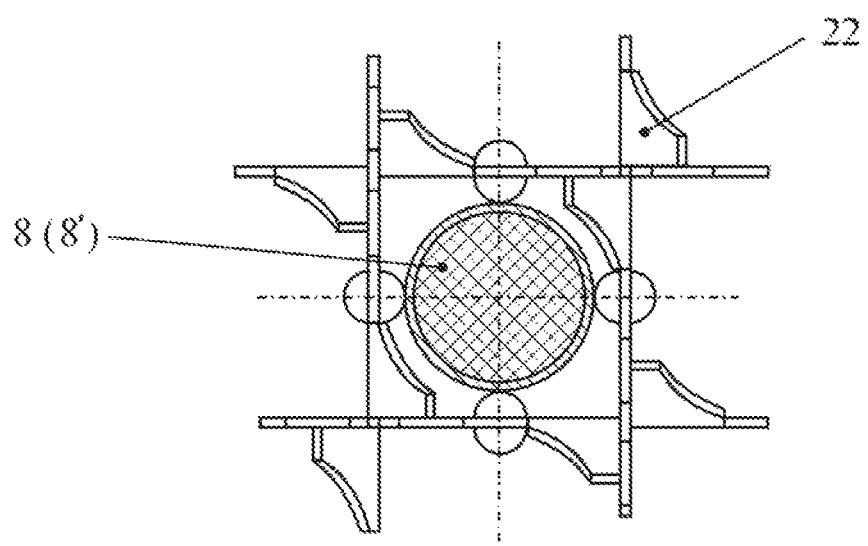
FIG. 9—a layout view of the blanket region fuel element location in a spacer grid.

Blanket region 3 contains a frame structure, formed by four angle elements 20, and four poles 21, that are attached to lower nozzle 6. Spacer grids 22 are secured to a frame structure through the holes in which the fuel elements 8 fuel elements go (FIG. 9). The spacer grids 22 have an opening in their central zone for housing seed region 2 therein.

Figure 3:
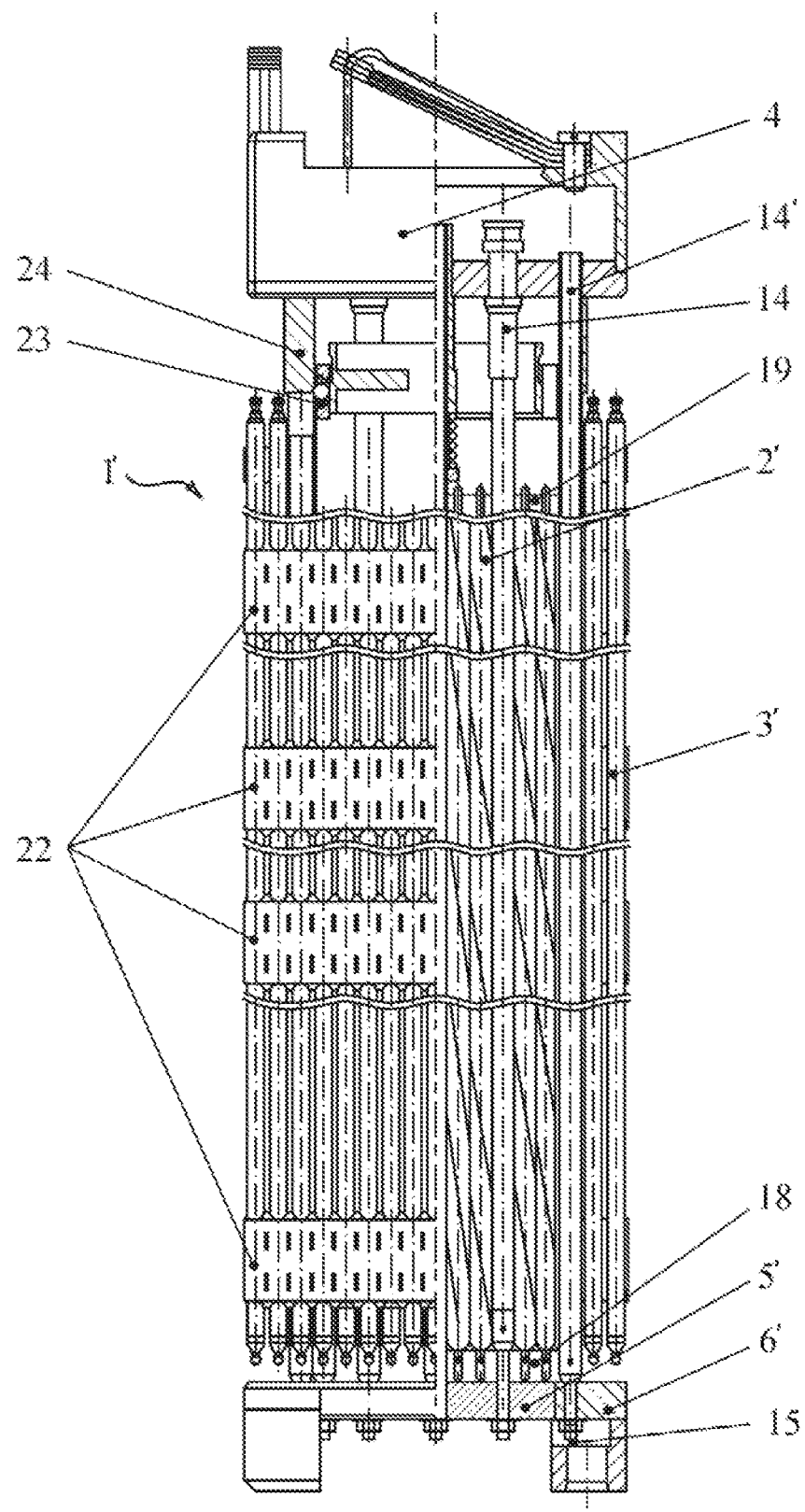
FIG. 3—a general view of a fuel assembly that conforms to the second embodiment of the invention.
Figure 4:
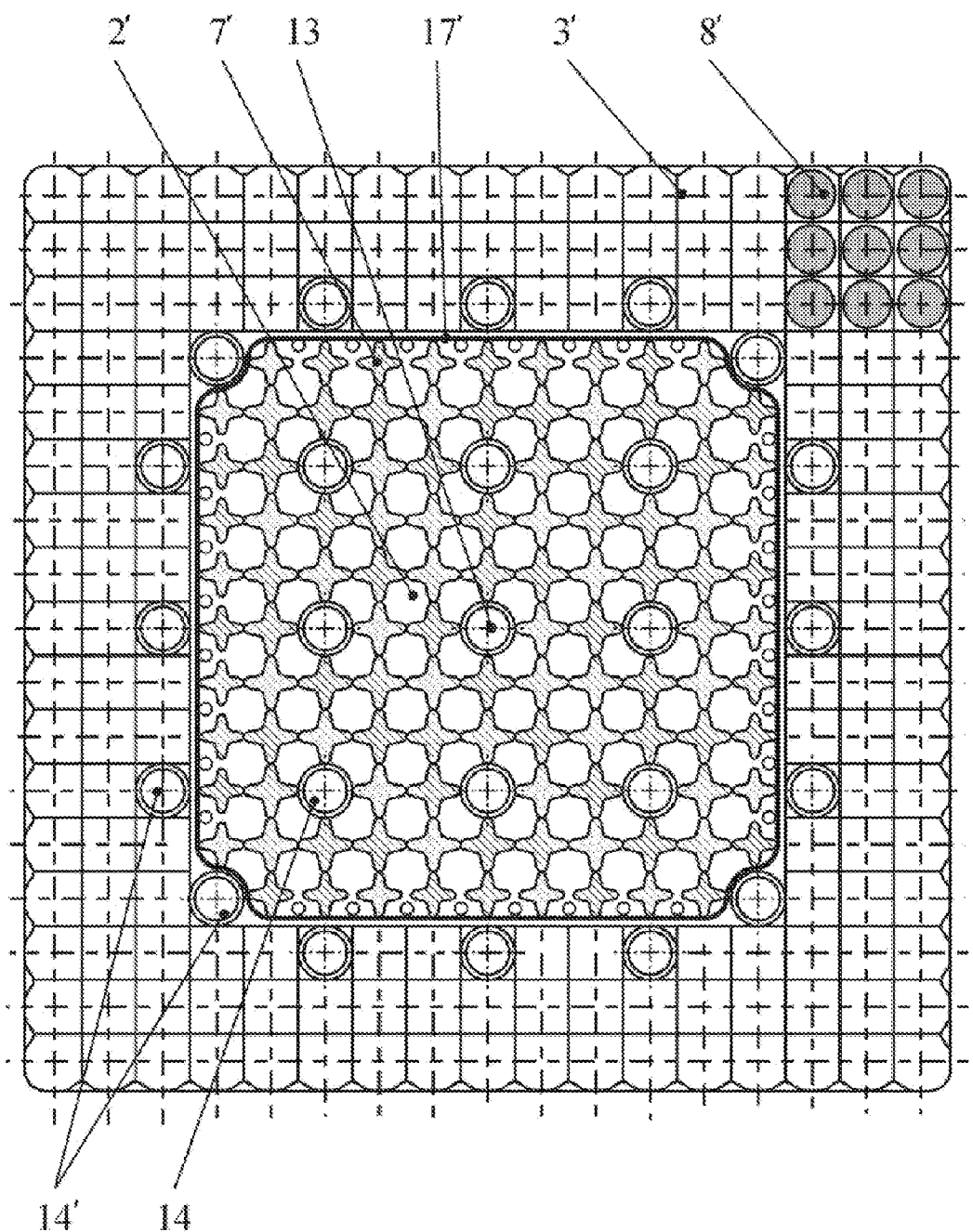
FIG. 4—a cross-sectional layout view of a fuel assembly that conforms to the second embodiment of the invention.

A fuel assembly designated as collective item 1', according to the second embodiment of the invention, is shown in FIG. 3. This assembly contains a seed region 2', a blanket region 3', a upper nozzle 4', a seed region lower nozzle 5', and a blanket region lower nozzle 6'. As shown in FIG. 4, seed region 2' contains fuel elements' bundle 7' while blanket region 3' contains fuel elements' bundle 8'.

Similar to the fuel assembly that conforms to the first embodiment of the invention, each of fuel elements 7' has a four-lobed profile that forms spiral spacer ribs 9 (FIG. 6) along the length of the fuel element and contains a kernel 10 (FIG. 7), which includes enriched uranium or plutonium, as well as a cladding 11, made from a zirconium alloy that surrounds the kernel. Displacer 12 is located inside of kernel 10. Each of fuel elements 8' has a round shape in the plan view and is made from various ceramic formulations of thorium and uranium.

The fuel elements module 7' and 8' are arranged in the rows and columns of a square coordinate grid in the cross-section, so that the fuel assembly as a whole has the shape of a square in the plan view. In particular, the fuel elements of seed region 7' and blanket region 8' are arranged along 17 rows and 17 columns of a square coordinate grid, at that the fuel elements 7' are arranged in 11 rows and 11 columns in this grid's midsection.

The profiles of fuel elements 7', positioned in the outermost rows and columns of a square coordinate grid, have an identical width across corners, amounting, for example, to 10.3 mm. The profiles of remaining fuel elements 7' have an identical and larger width across corners, amounting to, for example, 12.6 mm. The number of fuel elements 7', positioned in the outermost rows and columns of the square coordinate grid is 36 (9 in each outmost row and column of the square coordinate grid), while the number of the remaining fuel elements 7' is 72. The fuel elements 8' have an identical diameter that amounts to, for example, 9.5 mm, and are arranged in three rows and columns of a square coordinate grid. The number of fuel elements 8' is 156.

Similar to the fuel assembly that conforms to the first embodiment of the invention, a tube 13 is located in the center of seed region 2' that forms a guiding channel for housing the controls therein. Some of the guide tubes 14 are located within the confines of seed region 2' for the insertion of the absorber rods and the safety rods, which are installed in upper nozzle 4 so as to make axial shifting possible and are linked to lower nozzle 5' of seed region 2' by means of a threaded joint 15, or a collet fixture 16 (FIG. 8). The remaining peripheral guide tubes 14' are located within the confines of blanket region 3', is installed in upper nozzle 4 so as to make axial shifting possible, and is linked to lower nozzle 6' of blanket region 3' by means of threaded joint 15 of collet fixture 16 (FIG. 8).

Similar to the fuel assembly that conforms to the first embodiment of the invention, fuel elements' bundle 7' of seed region 2' is encircled by a channel 17', that is fastened to lower nozzle 5'. The lower end sections of the fuel elements 7' of seed region 2' are positioned in supporting frame structure 18, while their upper end sections are positioned in guiding grid 19 (FIG. 3).

Similar to the fuel assembly that conforms to the first embodiment of the invention, blanket region 3' contains a frame structure that is formed by peripheral guide tubes 14', for the insertion of the absorber rods and the safety rods installed in upper nozzle 4, so as to make axial shifting possible. Spacer grids 22 are attached to the frame structure, through the openings, through which the fuel elements 8' go (FIG. 9). The spacer grids 22 have an opening in the central zone to accommodate the positioning of seed region 2' therein.

Channel 17' of seed region 2' and the frame structure of blanket region 3' may be linked by means of detents, located in the upper section of fuel assembly 1', as shown in FIG. 3, using a ball detent, 23, that interacts with a shell ring, 24, that is secured to the frame structure of blanket region 3'.

As indicated above and as shown in FIG. 4, the fuel elements 7' of the outermost rows and columns of the square coordinate grid of seed region 2' have a smaller width across corners than that of the remaining fuel elements 7' of seed region 2'. In order to stabilize the relative position of the fuel elements 7' fuel elements within channel 17', devices are positioned on its interior surface for limiting the lateral movement of the fuel elements 7'.

The layout of the fuel elements in the peripheral region of a seed region that conforms to the second embodiment of the invention is depicted in FIG. 5. All the fuel elements 7' make contact with each adjacent fuel element in bundle 7' at the tangent points of spiral spacer ribs 9, which are apart from one another in the axial direction at a distance equal 25% of the spiral line pitch value. The points where fuel elements 7' make contact with channel 17' of seed region 2' may be located in the regions of raised areas 25 (in the deformed areas of channel 17'), as shown in the right-hand part of FIG. 5. Spacer rods, 26, may be used as an alternative, as shown in the top part of FIG. 5, which are arranged in the axial direction and are attached to lower nozzle 6'. The solid and broken lines in FIG. 5 represent the four-lobed profiles of the fuel elements 7' fuel elements in different cross-sections in order to illustrate the locations of these contact points.

Fuel assemblies that conform to the invention at hand have fuel elements of seed region with a kernel 10, including enriched uranium or plutonium. Kernel 10 is primarily made from a uranium-zirconium (U—Zr) alloy, where the uranium fraction in the fuel compound is up to 30%, with uranium-235 isotope enrichment of up to 20%, or from a plutonium-zirconium (Pu—Zr) alloy, with a plutonium fraction of up to 30%. Displacer 12, positioned along the longitudinal axis of kernel 10, has practically square cross-sectional shape. The spiral line pitch of the spiral spacer ribs 9, amounts to 5%-30% of the fuel element length.

Figure 10:
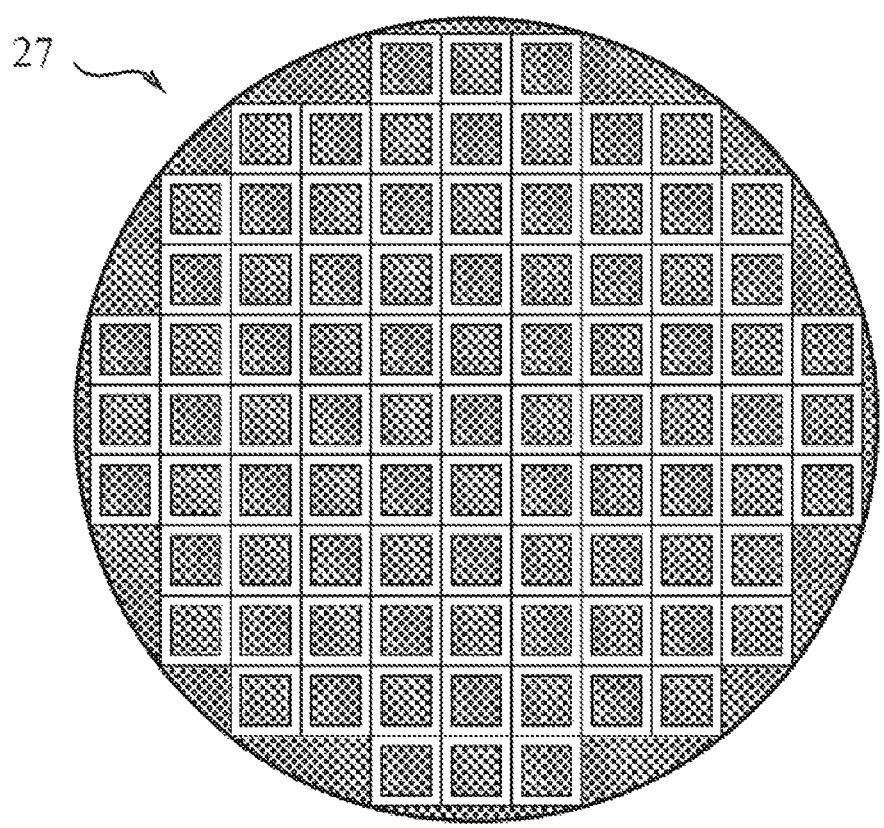
FIG. 10—a cross-sectional layout view of a reactor core that contains fuel assemblies executed according to the invention.

The reactor core has the same geometric configuration and dimensions as in a conventional light-water reactor of the PWR type (for example, the AP-1000, the EPR, etc.), so this reactor can be re-equipped with assemblies of this type and a core can be created from the required number of fuel assemblies. An example of a light-water reactor core 27 that altogether has a round cross-section and several fuel assemblies, each of which has a square cross-section, is shown in FIG. 10.

Fuel assembly 1, which conforms to the first embodiment of the invention, is executed in the following sequence. The fuel elements 7, the tube 13, and the guide tubes 14 are positioned in the lower supporting frame structure 18 of seed region 2. Supporting frame structure 18 is secured to lower nozzle 5 of seed region 2. The upper ends of the fuel elements 7, tube 13, and the guide tubes 14 are positioned in the upper guiding grid 19. Thereafter, channel 17 is slipped over the fuel elements' bundle, and is fastened to lower nozzle 5 and guiding grid 19. Upper nozzle 4 is installed on the upper end of tube 13 and the upper ends of the guide tubes 14 then tube 13 and the guide tubes 14 are secured in the upper nozzle 4 that makes axial movement possible.

A supporting frame structure, formed by angle elements 20 and poles 21, on which spacer grids 22 are located, is secured to lower nozzle 6 of blanket region 3. The fuel elements 8 of blanket region 3 are positioned in the spacer grids 22. Thereafter, upper nozzle 4 and seed region 2, containing the fuel elements 7, which is connected to the upper nozzle by means of tube 13 and the guide tubes 14, are inserted into the opening in the spacer grids 22, whereupon the lower sections of tube 13 and the peripheral guide tubes 14, are passed through lower nozzle 6 of blanket region and are subsequently secured, using a threaded joint 15, or a collet fixture 16. Thus, seed region 2 and blanket region 3 are linked to one another.

Aggregate fuel assembly 1 is installed in the reactor core 27.

After fuel assembly 1' is removed from reactor core 27, fuel assembly 1 is dismantled in reverse order.

Fuel assembly 1', which conforms to the second embodiment of the invention, is executed in different ways, depending upon the method, used for the relative anchoring of seed region 2' and blanket region 3'.

1. If a ball detent 23 is used, it is fastened to channel 17'. Further seed region 2' is executed in a manner similar to seed region 2 in the first embodiment of the invention. The bundle 7' fuel elements, tube 13, and the guide tubes 14 are positioned in the lower supporting frame structure 18 of seed region 2'. Supporting frame structure 18 is secured to seed region 2' lower nozzle 5'. The upper ends of the bundle 7' fuel elements, tube 13, and the guide tubes 14, are positioned in upper guiding grid 19. Thereafter, channel 17' is slipped over the fuel elements' bundle, whereupon it is secured to lower nozzle 5' and guiding grid 19. Upper nozzle 4 is installed on the upper end of tube 13 and the upper ends of the guide tubes 14, whereupon tube 13 and the guide tubes 14, are secured so as to make axial movement possible.

The peripheral guide tubes 14', are installed in the lower nozzle 6 of blanket region 3' and the spacer grids 22 are fastened to the guide tubes 14'. The grids 22 form the frame structure of blanket region 3'. The fuel elements 8 of blanket region 3' are positioned in the spacer grids 22 and in shell ring 24.

Thereafter, upper nozzle 4 and seed region 2', containing the fuel elements 7', which is connected to the upper nozzle by means of tube 13 and the peripheral guide tubes 14' are inserted into the opening in the spacer grids 22 and the guide tubes 14' are secured within upper nozzle 4, so as to make axial movement possible. Ball detent 23 ensures the relative anchoring of seed region 2' and the frame structure of blanket region 3'.

Aggregate fuel assembly 1 is installed in reactor core 27.

After fuel assembly 1' is removed from reactor core 27, it is dismantled in reverse order.

2. If a threaded joint or a collet fixture is used, fuel assembly 1' is put together and dismantled in a manner similar to that, in which the fuel assembly in the first embodiment of the invention is put together/dismantled; i.e., lower nozzle 5 of seed region 2' and lower nozzle 6 of blanket region 3' are interconnected by means of a threaded joint 15 or a collet fixture 16.

In the reactor core 27, fuel assemblies 1 and 1' function similar to the way this occurs in known reactors of the PWR type (for example, the AP-1000, the EPR, etc.).

The use of the invention at hand makes it possible to ensure that the conservation of natural uranium is achieved due to the presence of a thorium component (the blanket region) in the fuel assembly design, since a secondary nuclear fuel in the form of uranium-233 accumulates over the course of the thorium burnout process, the combustion of which makes a significant contribution to the power generation of a core that contains assemblies of this type. This results in the improvement of nonproliferation characteristics and the simplification of the problem of handling spent fuel assemblies, since the accumulation of the secondary nuclear fuel (a plutonium suitable for making nuclear weapons) that is traditional for PWR reactors (for example, the AP-1000, the EPR, etc.) is reduced to a considerable extent (by 80%), while the new secondary nuclear fuel—uranium-233 (or more precisely, the portion thereof that is left over following its combustion in a thorium blanket region "in situ")—is unsuitable for making nuclear weapons due to its contamination by a uranium-232 isotope and even plutonium isotopes. Herewith, it is possible to simplify the problem of handling spent fuel assemblies by means of reducing waste volumes through an increase in specified fuel life and through a decrease in the content of isotopes with long-term radiation toxicity in the discharged fuel.

Designing a fuel assembly in accordance with the invention at hand facilitates its use in reactors of the PWR type (for example, the AP-1000, the EPR, etc.) due to its mechanical, hydraulic, and neutronic compatibility with the standard fuel assembly designs.

The following ensure mechanical compatibility with the standard fuel assembly of a PWR reactor (for example, the AP-1000, the EPR, etc.):

the presence of a load-bearing frame structure that ensures resistance to deformation during prolonged operation and when high fuel burnouts are present, together with the identical nature of the connection dimensions;

the use of lower nozzle, upper nozzle, and load-bearing frame structure designs that are compatible with those of the similar components of standard fuel assemblies, and;

the compatibility of the seed region design with the designs of standard controls and recharging devices.

All the hydraulic characteristics of a fuel assembly that conforms to the invention at hand are in virtual agreement with those of a standard fuel assembly due to the presence of a system of two parallel channels, formed by the seed and blanket regions that are joined by common distributing (discharge) and return upper nozzleers. Herewith, the seed and blanket regions are hydraulically interlinked within the lower inlet and upper outlet sections. This fuel assembly execution ensures that the resistance of the core of a reactor of the PWR type (for example, the AP-1000, the EPR, etc.) with fuel assembles that conform to the invention remains at the standard value level. Thus, the installation of fuel assemblies that conform to the invention at hand in a PWR reactor (for example, the AP-1000, the EPR, etc.) does not lead to a change in the coolant flow rate in the reactor's primary circuit. Here, the hydraulic resistance ratio between the assembly inlet, the core section of the blanket region, and the assembly outlet in fuel assemblies that conform to the invention and in a standard fuel assembly are close, which ensures the hydraulic compatibility of fuel assemblies that conform to the invention with standard assemblies, as well as the absence of unconventional (additional) coolant leaks between them. This makes it possible to use some of fuel assemblies that conform to the invention at hand in a reactor at the same time that standard reactor fuel assemblies are used.

The following ensure neutron-physical compatibility with a standard fuel assembly:

the specified life until burnout is achieved through the use of specially selected fuel compounds and compounds that contain a burnable absorber;

the standard power of a fuel assembly is achieved through the use of specially selected fuel charge contents in the seed and blanket region fuel compounds;

the satisfaction of the requirements governing energy release profile nonuniformity is achieved through the use of specially selected fuel charge contents in the various rows of the seed region fuel elements and the fuel charge content in the blanket region;

retaining the reactivity effects within the range, typical for standard fuel assemblies, is achieved through the use of specially selected fuel compound characteristics, and;

the compatibility of the two-section fuel assembly design with a standard fuel channel (tube) arrangement for housing the controls ensures the possibility of power level regulation and power discharge by standard controls.

An advantage of the invention at hand is also the fact that a two-section fuel assembly, conforming to this invention, is dismountable, which makes it possible to ensure an independent modular charging of the seed region. More frequent modular charging of seed region makes it possible to create more favorable conditions (as far as neutron balance and duration of irradiation) for the thorium, placed into an assembly's blanket region.

We claim:

1. A fuel assembly for a light-water nuclear reactor with a square shape in the plan view and comprising:

a seed region, including a bundle of seed fuel elements that are arranged in the rows and columns of a square coordinate grid in a cross-section; wherein each seed fuel element has a four-lobed profile forming spiral ribs, and comprises a kernel that includes enriched uranium or plutonium; and a blanket region, surrounding the seed region and including a bundle of breeding fuel elements;

wherein, when viewed in a plan-view cross-section, the breeding fuel elements are arranged in the rows and columns of a square coordinate grid, and the breeding fuel elements define a plurality of square-shaped rings surrounding the seed region;

further wherein each of the seed fuel elements defines a first circumscribed diameter defined by a circle circumscribing the seed fuel element, and each of the breeding fuel elements defines a second circumscribed diameter defined by a circle circumscribing the breeding fuel element that is different than the first circumscribed diameter.

2. The fuel assembly of claim 1, wherein the blanket region comprises a lower nozzle of blanket region, as well as lengthwise-arranged angle elements and several lengthwise-arranged poles; herewith, the lower nozzle of blanket region is rigidly connected to the aforementioned angle elements and poles, thereby forming a frame structure of blanket region.

3. The fuel assembly of claim 1, the dimensions and shape, as well as the neutronic and thermo hydraulic properties of which, match the dimensions and shape, as well as the neutronic and thermohydraulic properties, of a traditional fuel assembly for a PWR-type reactor, thereby ensuring their interchangeability.

4. The fuel assembly of claim 1, comprising guiding channels, some of which are situated within the seed region, while the remaining channels are situated within the blanket region; herewith, all the guide tubes are positioned in such a manner, as to match the position of the guide tubes for the fuel assembly control rods of a PWR-type nuclear reactor.

5. A light-water nuclear reactor comprising a set of fuel assemblies, wherein the set of fuel assemblies comprises at least one fuel assembly according to claim 1.

6. The fuel assembly of claim 1, wherein the seed region does not include breeding fuel elements, and the blanket region does not include seed fuel elements.

7. The fuel assembly of claim 1, wherein each of the breeding fuel elements comprises ceramic thorium.

8. The fuel assembly of claim 1, wherein the first circumscribed diameter is defined by a width across corners, and is 12.6 millimeters, and the second circumscribed diameter is 8.6 millimeters.

9. The fuel assembly of claim 1, wherein the second circumscribed diameter is smaller than the first circumscribed diameter.

10. The fuel assembly of claim 1, wherein the plurality of square-shaped rings consists of two square-shaped rings.

11. The fuel assembly of claim 10, further comprising guiding channels, positioned within the seed region in such a manner, as to match the position of the guide tubes for the fuel assembly control rods of a PWR-type nuclear reactor.

12. The fuel assembly of claim 11, wherein the fuel assembly comprises 24 guiding channels, positioned within the seed region in such a manner, as to match the position of the 24 guide tubes of the 17×17 fuel assembly control rods of a PWR-type reactor.

13. The fuel assembly of claim 1, wherein the plurality of square-shaped rings consists of three square-shaped rings.

14. The fuel assembly of claim 13, wherein the fuel elements of seed and blanket region within the fuel assembly's cross-section are arranged in the 17 rows and 17 columns of a square coordinate grid; wherein the seed fuel elements are positioned in 11 rows and 11 columns within this grid's midsection.

15. The fuel element of claim 14, wherein the plurality of seed fuel elements includes a plurality of primary seed fuel elements that are located in the fuel assembly's cross-section and that are arranged in 9 rows and 9 columns in the midsection of a square coordinate grid, as well as a plurality of secondary seed fuel elements that are positioned in the outermost rows and columns of the midsection of a square coordinate grid; wherein each of the plurality of primary seed fuel elements has a larger width across corners than that of each secondary seed fuel element.

16. The fuel assembly of claim 1, wherein the fuel elements of blanket region in the fuel assembly's cross-section are positioned in the two outermost rows and columns of a square coordinate grid made up of 19 rows and 19 columns, while the seed fuel elements are positioned in the rows and columns of a square coordinate grid, made up of 13 rows and 13 columns.

17. The fuel assembly of claim 16, comprising a shroud that has a square cross-sectional shape and separates the fuel elements of seed region from the fuel elements of the blanket region.

18. The fuel assembly of claim 17, comprising a lower nozzle of the seed region, connected to the shroud, wherein the fuel assembly further comprises a supporting frame structure that is fastened to the lower nozzle of the seed region, wherein the supporting frame structure is adapted to secure the seed fuel elements to the lower nozzle.

19. The fuel assembly of claim 17, comprising a guiding grid that is secured to the upper section of the shroud, wherein the guiding grid is adapted to receive the seed fuel elements in a manner that permits free axial movement of the seed fuel elements.

20. A fuel assembly for a light water nuclear reactor with a square shape in the plan view, the fuel assembly comprising:
a frame defining a square coordinate grid of positions;
a first plurality of fuel elements that are arranged in the rows and columns of the square coordinate grid in cross-section, each of the first plurality of fuel elements has a four-lobed profile forming spiral ribs, and comprises an alloy of fissile material; and
a second plurality of fuel elements that are arranged in the rows and columns of the square coordinate grid in cross-section and encircle the first plurality of fuel elements;
wherein the first plurality of fuel elements includes a plurality of primary first fuel elements that are arranged in the rows and columns in a midsection of the square coordinate grid, as well as a plurality of secondary first fuel elements that are arranged in rows and columns of the square coordinate grid that surround the plurality of primary first fuel elements; wherein each of the plurality of primary first fuel elements has a larger width across corners than that of each secondary first fuel element.

21. The fuel assembly of claim 20, wherein:
the second plurality of fuel elements define two peripheral square-shaped rings of positions surrounding the first plurality of fuel elements.

22. The fuel assembly of claim 20, wherein:
the first plurality of fuel elements comprises seed fuel elements, and the second plurality of fuel elements comprises breeding fuel elements.

* * * * *